(12) United States Patent
Chou et al.

(10) Patent No.: US 11,745,451 B2
(45) Date of Patent: Sep. 5, 2023

(54) DEVICE OF INFLATING AND REPAIRING BROKEN TIRE AND METHOD OF USING THE SAME

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

(*) Notice: Subject to any disclaimer, the term of this patent is extended or adjusted under 35 U.S.C. 154(b) by 0 days.

(21) Appl. No.: 17/835,925

(22) Filed: Jun. 8, 2022

(65) Prior Publication Data
US 2022/0402226 A1 Dec. 22, 2022

(30) Foreign Application Priority Data
Jun. 16, 2021 (TW) .................................. 110121996

(51) Int. Cl.
*B29C 73/16* (2006.01)
(52) U.S. Cl.
CPC .................................. *B29C 73/166* (2013.01)
(58) Field of Classification Search
CPC .................................................. B29C 73/166
See application file for complete search history.

(56) References Cited

U.S. PATENT DOCUMENTS 9,868,420 B2 * 1/2018 Chou ...................... F04B 35/04
9,873,232 B2 * 1/2018 Eckhardt .................... B60S 5/04
11,098,841 B2 * 8/2021 Chou ..................... B29C 73/166
2011/0116941 A1 5/2011 Lolli et al.
2014/0366981 A1 * 12/2014 Taniguchi ............... B60C 25/16
141/38

FOREIGN PATENT DOCUMENTS

JP 2015508718 3/2015
JP 2016203976 12/2016
WO WO-2017068549 A1 * 4/2017

OTHER PUBLICATIONS

"Search Report of Europe Counterpart Application", dated Nov. 11, 2022, p. 1-p. 7.

* cited by examiner

*Primary Examiner* — Timothy L Maust
(74) *Attorney, Agent, or Firm* — JCIPRNET (57) ABSTRACT

A method of using a device of inflating and repairing a broken tire contains a step of: placing the device on the ground. The device contains: an accommodation box, a sealant can, a cap, and at least one delivery hose. The accommodation box accommodates an air compressor for compressing air so as to produce compressed air. The accommodation box includes a first coupling orifice and a second coupling orifice. The sealant can includes a body in which sealant is received, and the cap is connected on an open end of the body. The cap includes an air inflow tube and a sealant supply tube), and the cap is engaged on the first coupling orifice or the second coupling orifice. The at least one delivery hose includes a first connector and a second connector connected with two components, thus inflating and repairing the broken tire diversely.

7 Claims, 13 Drawing Sheets

DEVICE OF INFLATING AND REPAIRING BROKEN TIRE AND METHOD OF USING THE SAME

FIELD OF THE INVENTION

The present invention relates to a device of inflating and repairing a broken tire and a method of using the same, the device contains an accommodation box in which an air compressor is received, and the accommodation box includes a first coupling orifice and a second coupling orifice.

BACKGROUND OF THE INVENTION

A conventional air compressor is applied to repair and inflate a broken tire, and the air compressor contains an accommodation box in which an air compressor is received, a sealant can in which sealant is accommodated, and one or two delivery hose. The accommodation box includes an air inflow tube and a sealant supply tube which are screwed with a cap on an open end of the sealant can. However, the accommodation box is only connected with a sole delivery hose or the sealant can.

The present invention has arisen to mitigate and/or obviate the afore-described disadvantages.

SUMMARY OF THE INVENTION

The primary aspect of the present invention is to provide a device of inflating and repairing a broken tire and a method of using the same by which the first coupling orifice and the second coupling orifice are defined on two different positions of an accommodation box of the air compressor, wherein the first coupling orifice is configured to solely inflate the compressed airs into the broken tire or to simultaneously inflate the compressed airs and supply sealant into the broken tire, and the second coupling orifice is configured to accommodate the sealant can on the accommodation box, such that the accommodation box does not move when inflating the compressed airs into the broken tire.

Secondary aspect of the present invention is to provide a device of inflating and repairing a broken tire and a method of using the same by which the first coupling orifice is adjacent to the output hose of the accommodation box, and a first end of one of the at least one delivery hose is connected with the output hose, and a second end of the one delivery hose is connected with an air nozzle of the broken tire to inflate the compressed airs into the broken tire directly, and the sealant can is selectively accommodated in the second coupling orifice of the accommodation box.

Third aspect of the present invention is to provide a device of inflating and repairing a broken tire and a method of using the same by which the cap of the sealant can is received in the second coupling orifice of the accommodation box so as to erect the sealant can on the accommodation box, wherein the air inflow tube of the cap is connected with the second end of the one delivery hose, the first end of the one delivery hose is connected with the output hose of the first coupling orifice, the sealant supply tube of the cap is locked with a first fixing segment of the other delivery hose, and a second fixing segment of the other delivery hose is locked on the air nozzle of the broken tire, such that the device is configured to inflate the compressed airs and to supply the sealant simultaneously, the one delivery hose does not twine with the other delivery hose, and the sealant can is received in the second coupling orifice to locate away from the first coupling orifice for connecting with the output hose which is connected with the one delivery hose, thus operating the device smoothly.

Further aspect of the present invention is to provide a device of inflating and repairing a broken tire and a method of using the same by which the first end of the one delivery hose is connected with the output hose of the first coupling orifice, the second end of the one delivery hose is locked with the air inflow tube of the cap of the sealant can, the cap is engaged with the first coupling orifice, and the sealant can is erected on the accommodation box, such that the compressed airs flow from the air compressor to force the sealant of the sealant can via the output hose and the one delivery hose so that the sealant is outputted out of the sealant supply tube of the cap, wherein the sealant supply tube of the cap is locked with the first fixing segment of the other delivery hose, and the second fixing segment of the other delivery hose is locked on the air nozzle of the broken tire, such that the compressed airs force the sealant into the broken tire, and the broken tire is inflated by the compressed airs and is repaired by the sealant, wherein the one delivery hose is defined between the output hose of the accommodation box and the air inflow tube of the cap of the cap, such that the sealant does not contact and block the output hose of the air compressor and does not flow into the air compressor.

Another aspect of the present invention is to provide a device of inflating and repairing a broken tire and a method of using the same by which the sealant can is connected with the first coupling orifice by using the cap, the air inflow tube of the cap is connected with the output hose of the first coupling orifice of the accommodation box, and the cap includes a sealant supply tube locked with the nozzle of the broken tire via the one delivery hose, thus supplying the sealant into the broken tire.

DETAILED DESCRIPTION OF THE PREFERRED EMBODIMENTS

Figure 1:
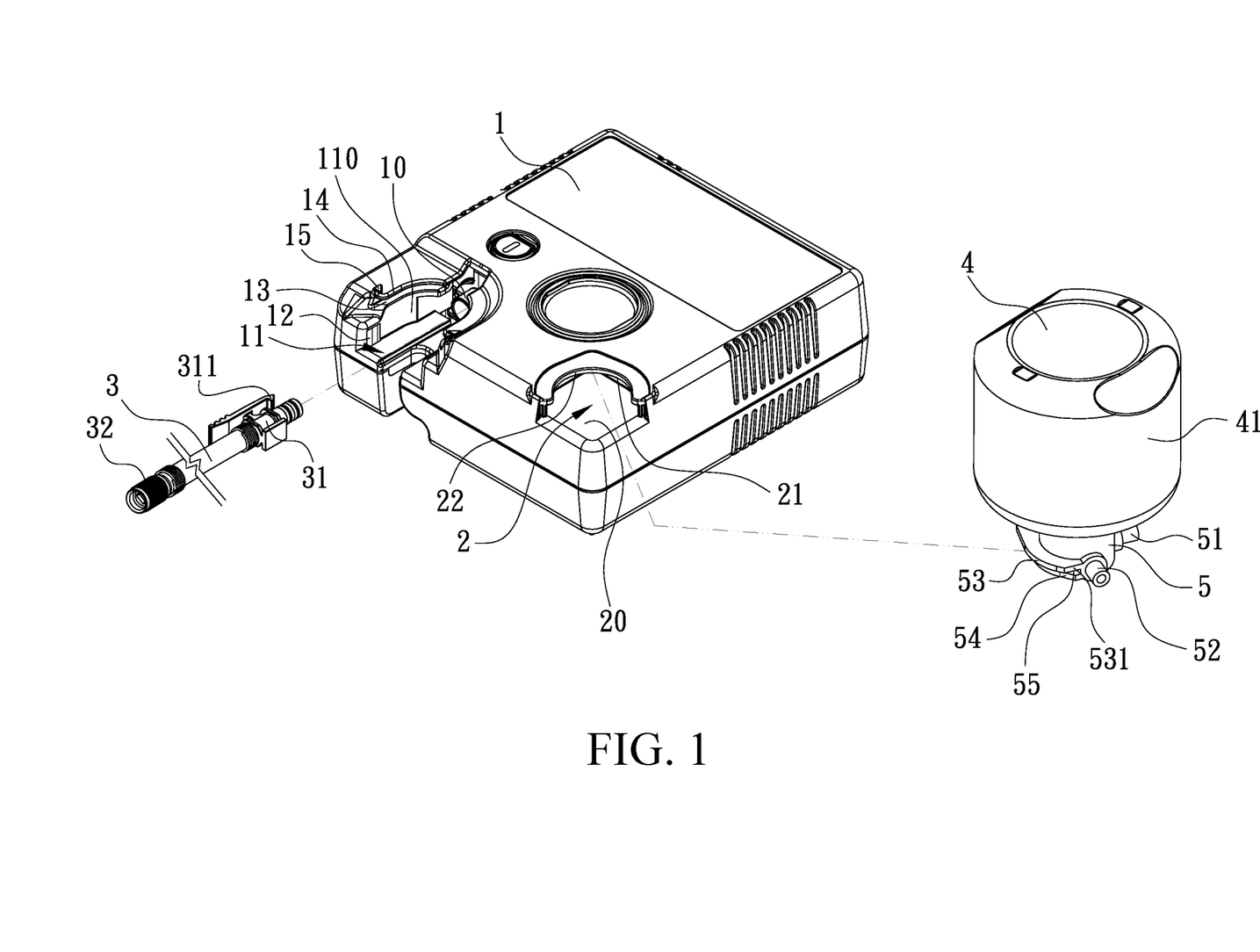
FIG. 1 is a perspective view showing the exploded components of a device of inflating and repairing a broken tire and a method of using the same according to a preferred embodiment of the present invention.

With reference to FIG. 1, a method of using a device of inflating and repairing a broken tire according to a preferred embodiment of the present invention, the device is placed on a ground and comprises an accommodation box 1 in which an air compressor (not shown) is received.

Figure 2:
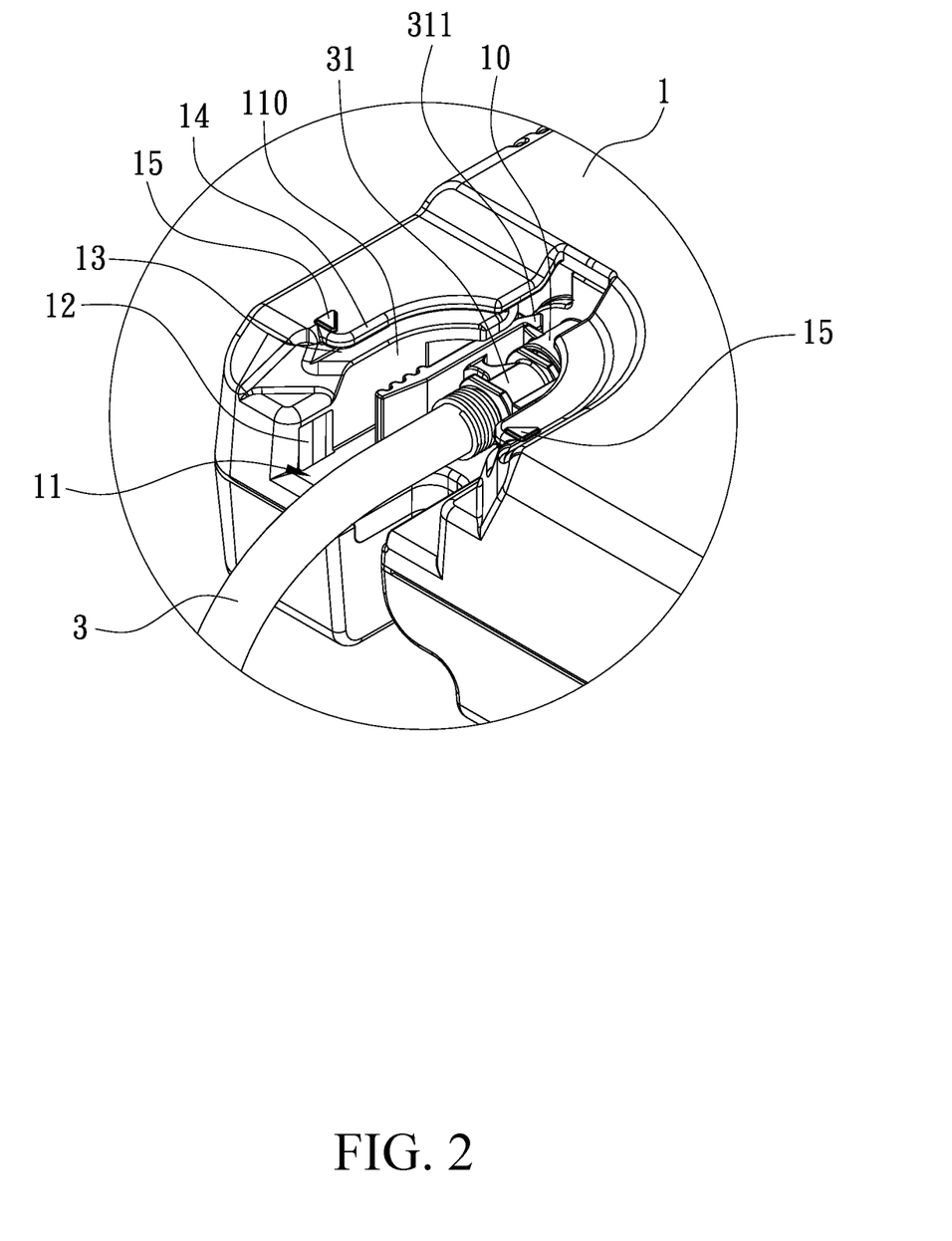
FIG. 2 is a perspective view showing the operation of a part of the device of inflating and repairing the broken tire and the method of using the same according to the preferred embodiment of the present invention.
Figure 3:
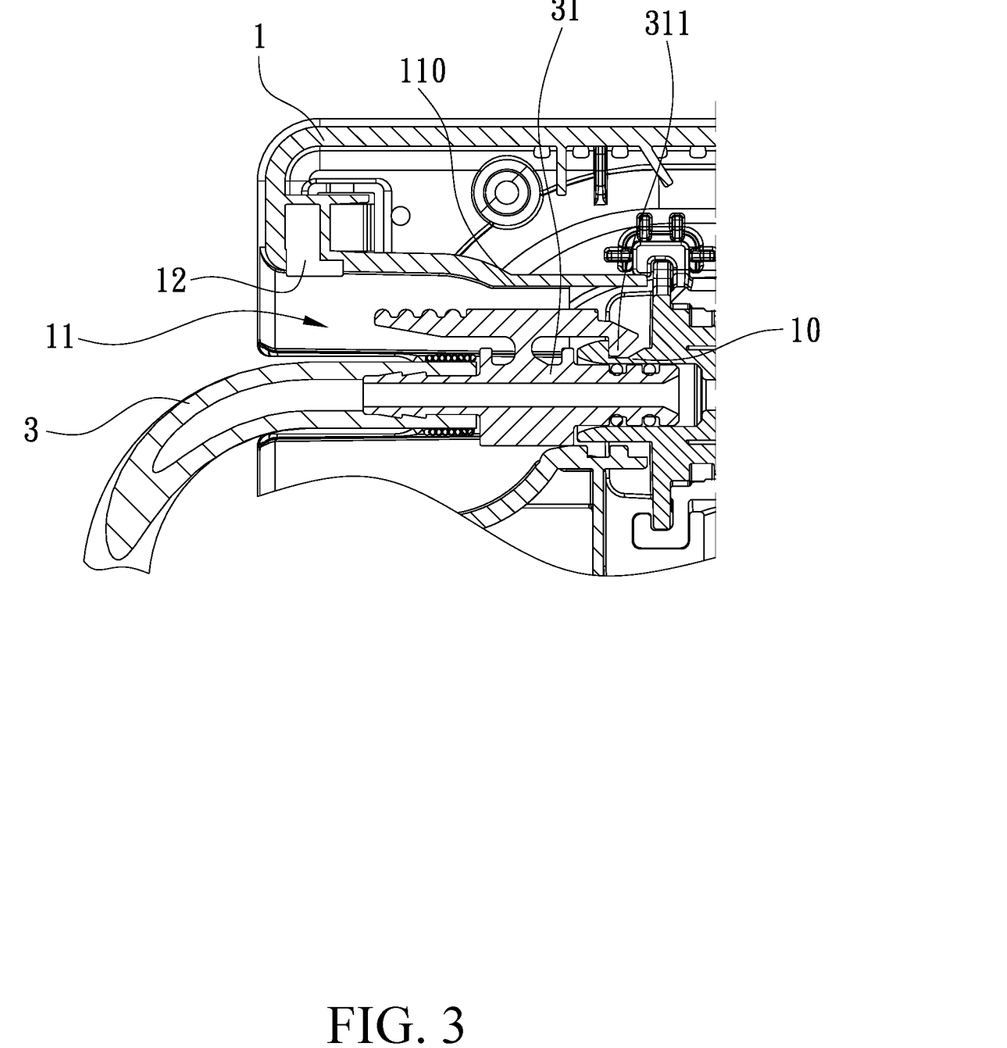
FIG. 3 is a cross sectional view showing the operation of a part of the device of inflating and repairing the broken tire and the method of using the same according to the preferred embodiment of the present invention.

Referring to FIGS. 1-3, the air compressor is configured to compress airs so as to produce compressed airs, and the compressed airs are outputted via an output hose 10. The accommodation box 1 includes a first coupling orifice 11 configured to solely inflate the compressed airs into the broken tire or to simultaneously inflate the compressed airs and supply sealant into the broken tire, a second coupling orifice 2 configured to accommodate a sealant can 4 on the accommodation box 1, such that the accommodation box 1 does not move when inflating the compressed airs into the broken tire.

Referring further to FIGS. 1 and 2, the first coupling orifice 11 of the accommodation box 1 is formed in an inverted U shape, the first coupling orifice 11 has a first notch 12 formed on a bottom of an peripheral wall thereof, a second notch 13 formed on a top of the peripheral wall of the first coupling orifice 11 opposite to the first notch 12, a partition 14 formed adjacent to a top of the second notch 13, and a protrusion 15 formed on the partition 14.

As shown in FIGS. 1-4, a method of using the device comprises a step of:

1) coupling the accommodation box 1, wherein the first coupling orifice 11 of the accommodation box 1 is proximate to the output hose 10, and a first end of a first delivery hose 3 is connected with the output hose 10, wherein the first delivery hose 3 includes a first connector 31 connected on the first end thereof, and the first connector 31 has a first retainer 311 configured to movably engage the first connector 31 with the output hose 10 of the accommodation box 1, and the first delivery hose 3 further includes a second connector 32 connected on a second end thereof and configured to couple with an air nozzle (not shown) of the broken tire, thus inflating the compressed airs. Furthermore, the sealant can 4 is selectively accommodated in the second coupling orifice 2 of the accommodation box 1.

Figure 4:
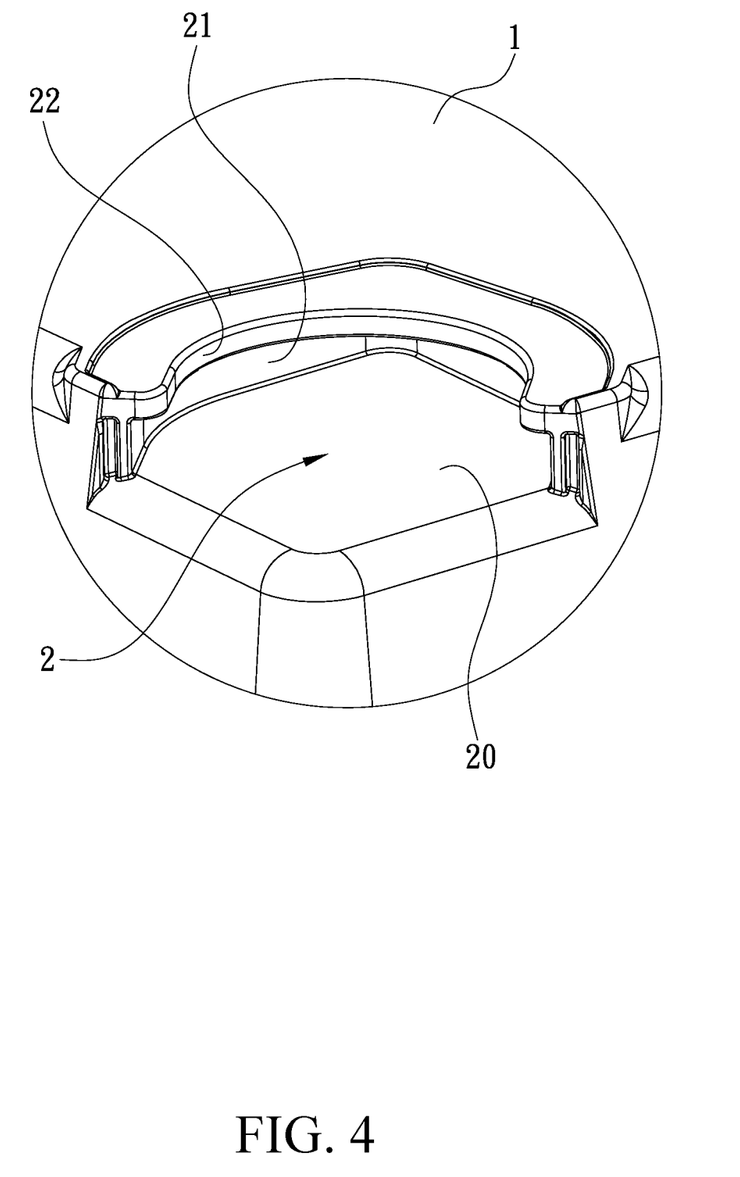
FIG. 4 is a perspective view showing the assembly of a part of the device of inflating and repairing the broken tire and the method of using the same according to the preferred embodiment of the present invention.
Figure 7:
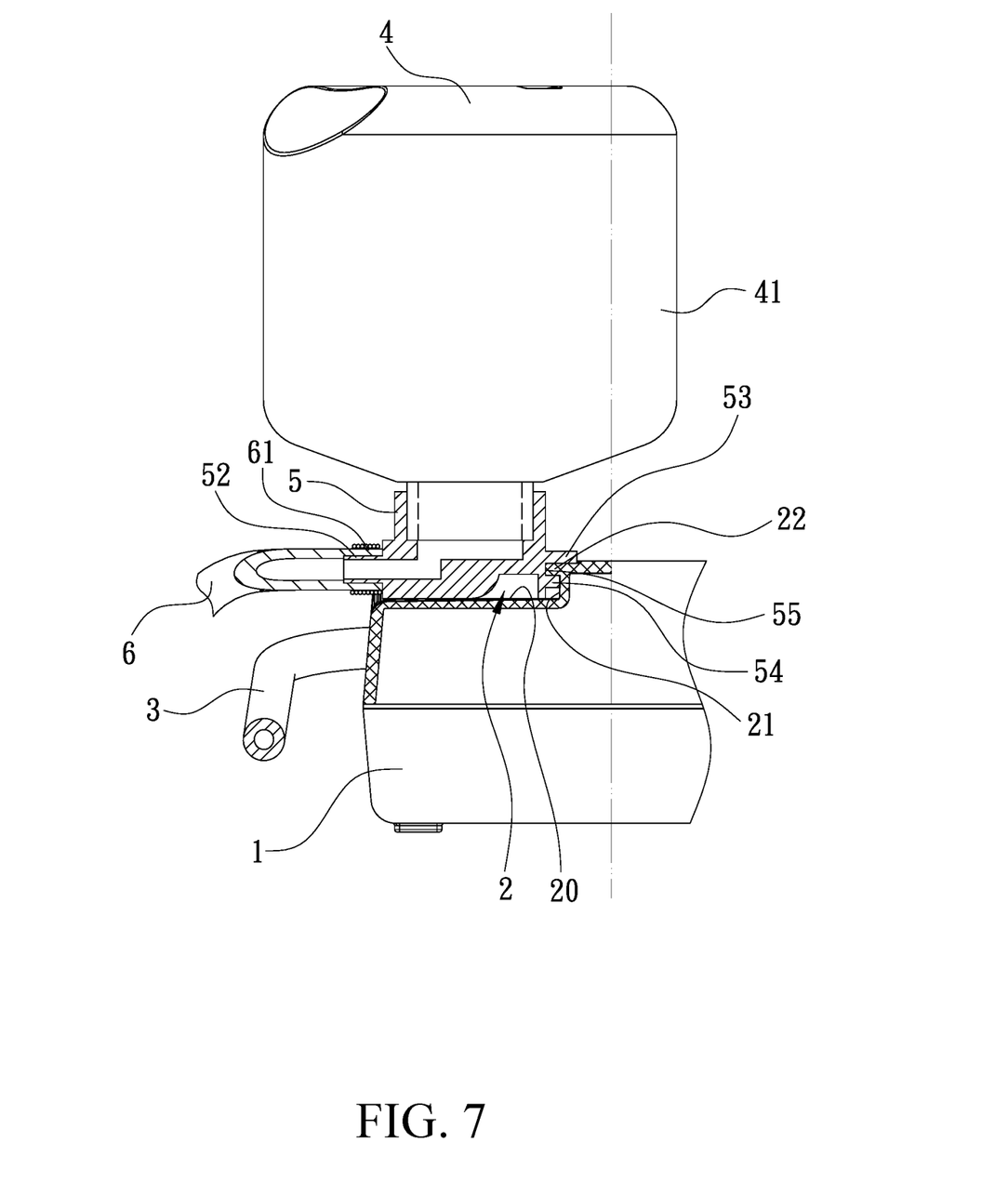
FIG. 7 is a cross sectional view showing the operation the device of inflating and repairing the broken tire and the method of using the same according to another preferred embodiment of the present invention.

As shown in FIG. 4, the second coupling orifice 2 of the body 1 further includes a plane 20 formed on a bottom thereof, an internal fence 21 extending upward from a peripheral side of the plane 20, and a C-shaped rib 22 extending inward from a top of the internal fence 21, wherein a receiving space is defined between the C-shaped rib 22 and the plane 20 to accommodate a cap 5 of the sealant can 4, and the sealant can 4 further includes a body 41, as shown in FIG. 1, the cap 5 is screwed on the body 41 of the sealant can 4, and the cap 5 includes an air inflow tube 51, a sealant supply tube 52, a first peripheral rib 53 horizontally extending from an outer wall of the cap 5, a second peripheral rib 54 extending from the outer wall of the cap 5 and spaced from the first peripheral rib 53, and a groove 55 defined between the first peripheral rib 53 and the second peripheral rib 54 and configured to engage with the C-shaped rib 22 of the second coupling orifice 2 (as illustrated in FIG. 7), wherein the second peripheral rib 54 abuts against the internal fence 21 of the second coupling orifice 2, and the cap 5 of the sealant can 4 is received in the second coupling orifice 2 so that the accommodation box 1 is stable when inflating the compressed airs to the broken tire.

Figure 5:
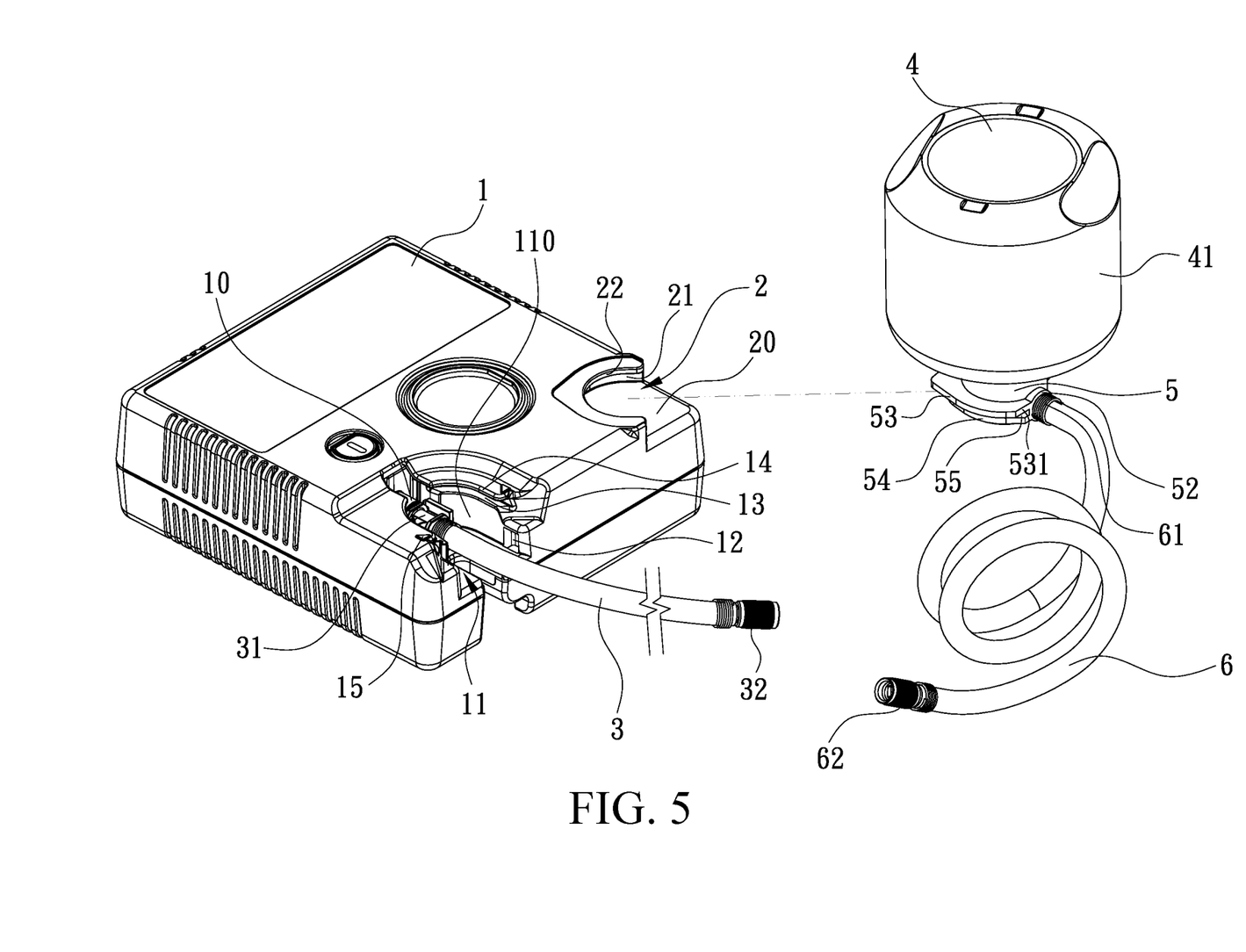
FIG. 5 is a perspective view showing the exploded components of a device of inflating and repairing a broken tire and a method of using the same according to another preferred embodiment of the present invention.
Figure 6:
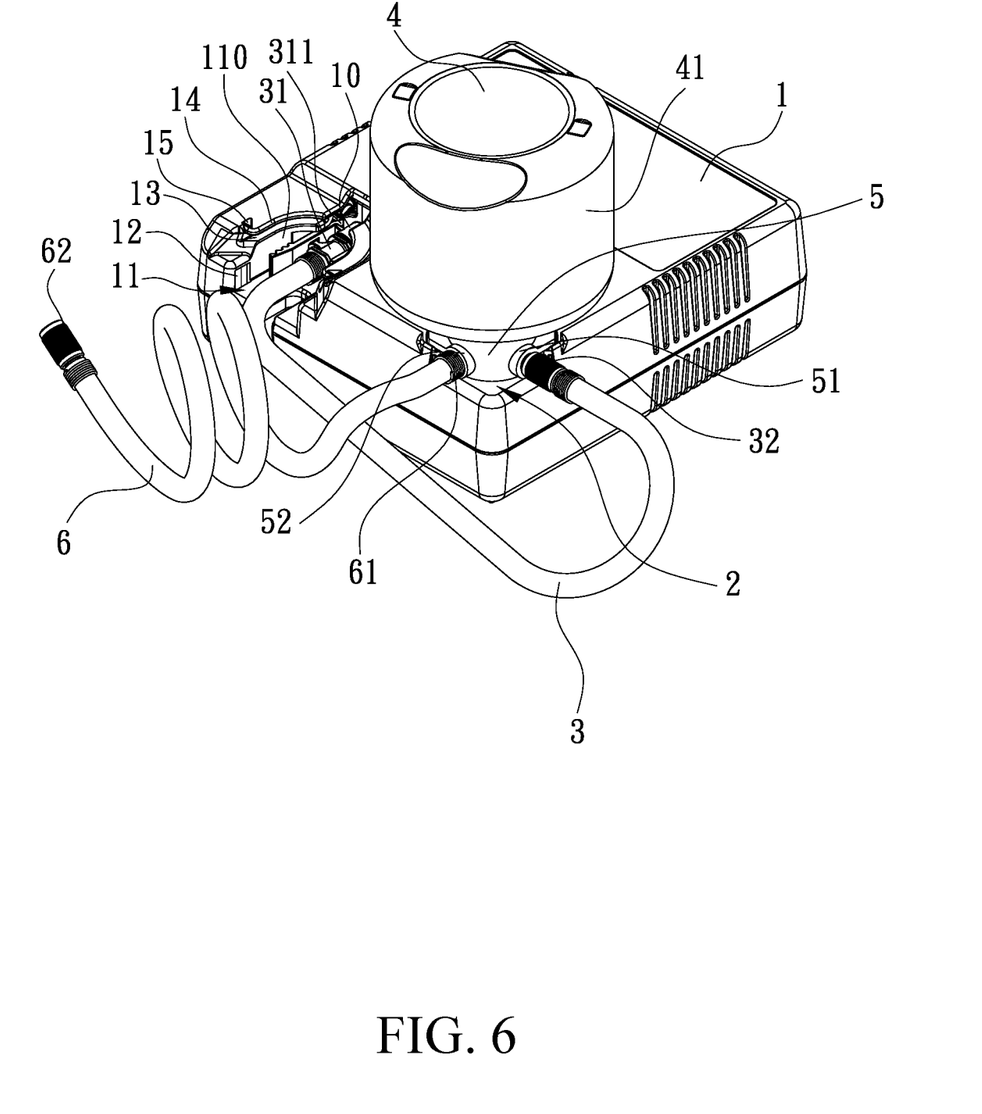
FIG. 6 is a perspective view showing the assembly of the device of inflating and repairing the broken tire and the method of using the same according to another preferred embodiment of the present invention.

With reference to FIGS. 5-7, the method of using the device further comprises a step of:

2) receiving the cap 5 of the sealant can 4 in the second coupling orifice 2 of the accommodation box 1 so as to erect the sealant can 4 on the accommodation box 1, wherein the groove 55 of the cap 5 is engaged with the C-shaped rib 22 of the second coupling orifice 2 (as shown in FIG. 7), the second peripheral rib 54 abuts against the internal fence 21 of the second coupling orifice 2, and the cap 5 of the sealant can 4 is received in the second coupling orifice 2, wherein an air inflow tube 51 of the cap 5 is connected with the second connector 32 of the first delivery hose 3, the first connector 31 of the first delivery hose 3 is connected with the output hose 10 of the first coupling orifice 11, the sealant supply tube 52 of the cap 5 is locked with a first fixing segment 61 of a second delivery hose 6, and a second fixing segment 62 of the second delivery hose 6 is locked on the air nozzle (not shown) of the broken tire, such that the device is configured to inflate the compressed airs and to supply the sealant simultaneously, the first delivery hose 3 does not twine with the second delivery hose 6, and the sealant can 4 is received in the second coupling orifice 2 to locate away from the first coupling orifice 11 for connecting with the output hose 10 which is connected with the first delivery hose 3, thus operating the device smoothly.

Figure 8:
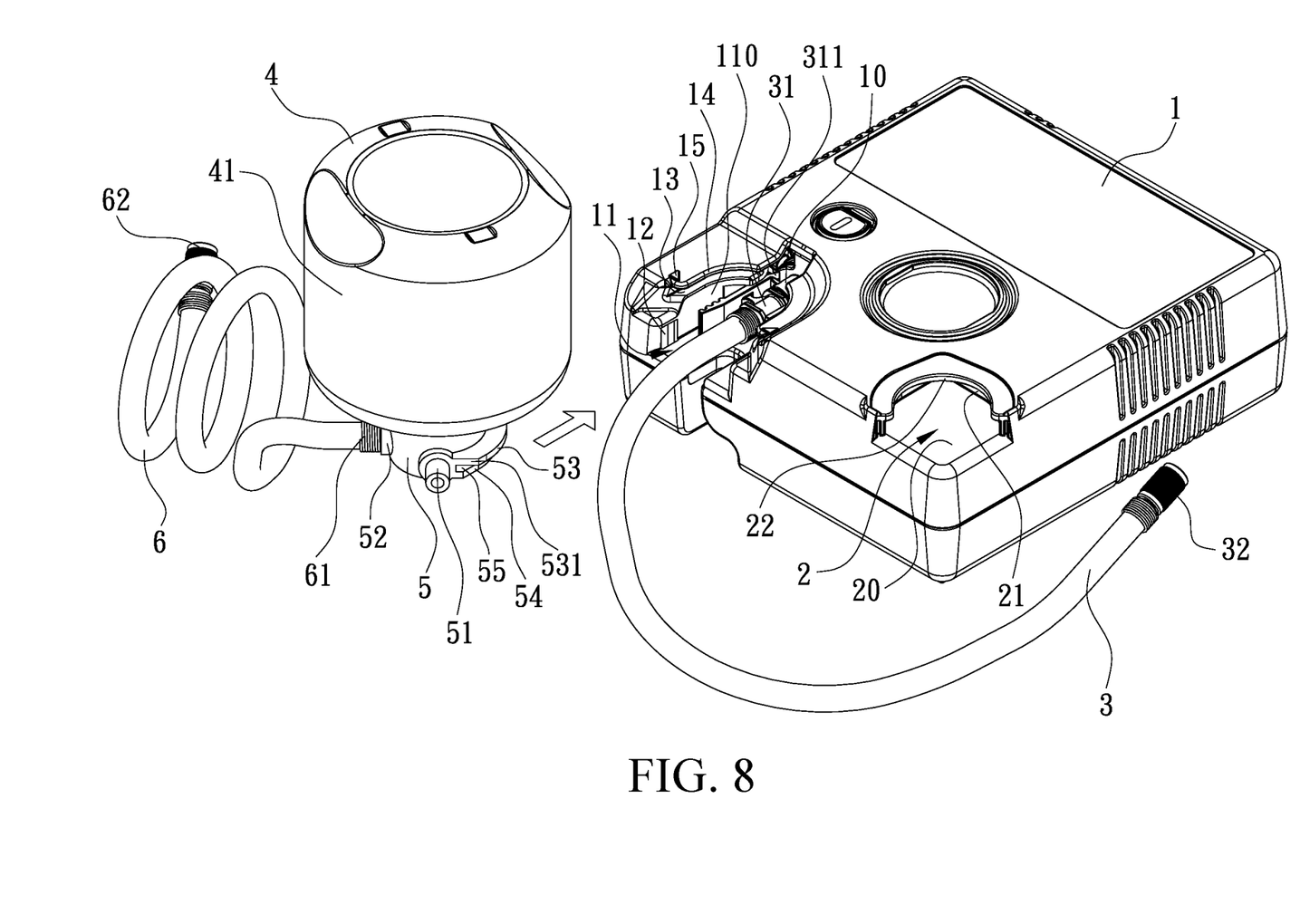
FIG. 8 is a perspective view showing the exploded components of a device of inflating and repairing a broken tire and a method of using the same according to another preferred embodiment of the present invention.
Figure 9:
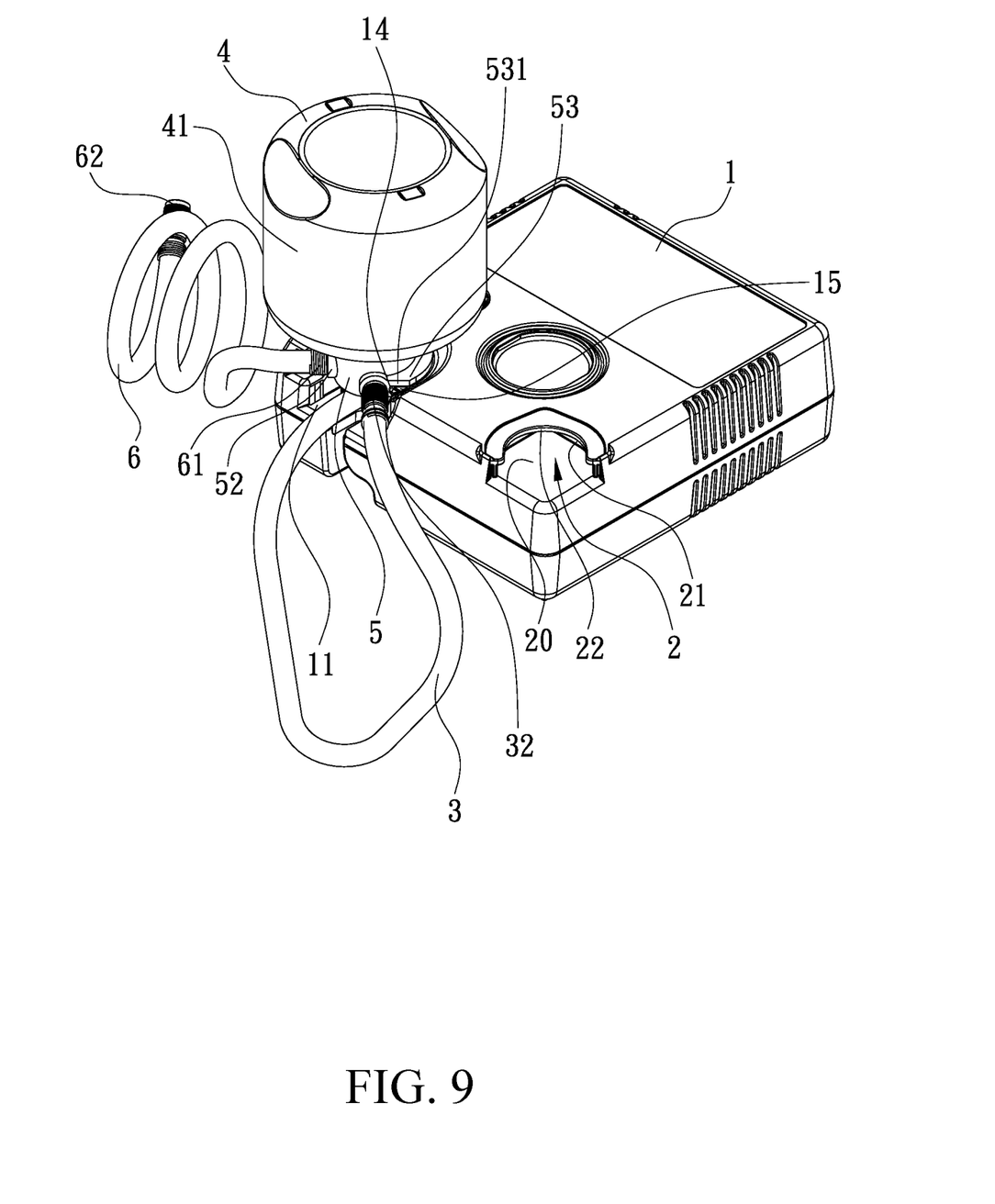
FIG. 9 is a perspective view showing the assembly of the device of inflating and repairing the broken tire and the method of using the same according to another preferred embodiment of the present invention.
Figure 10:
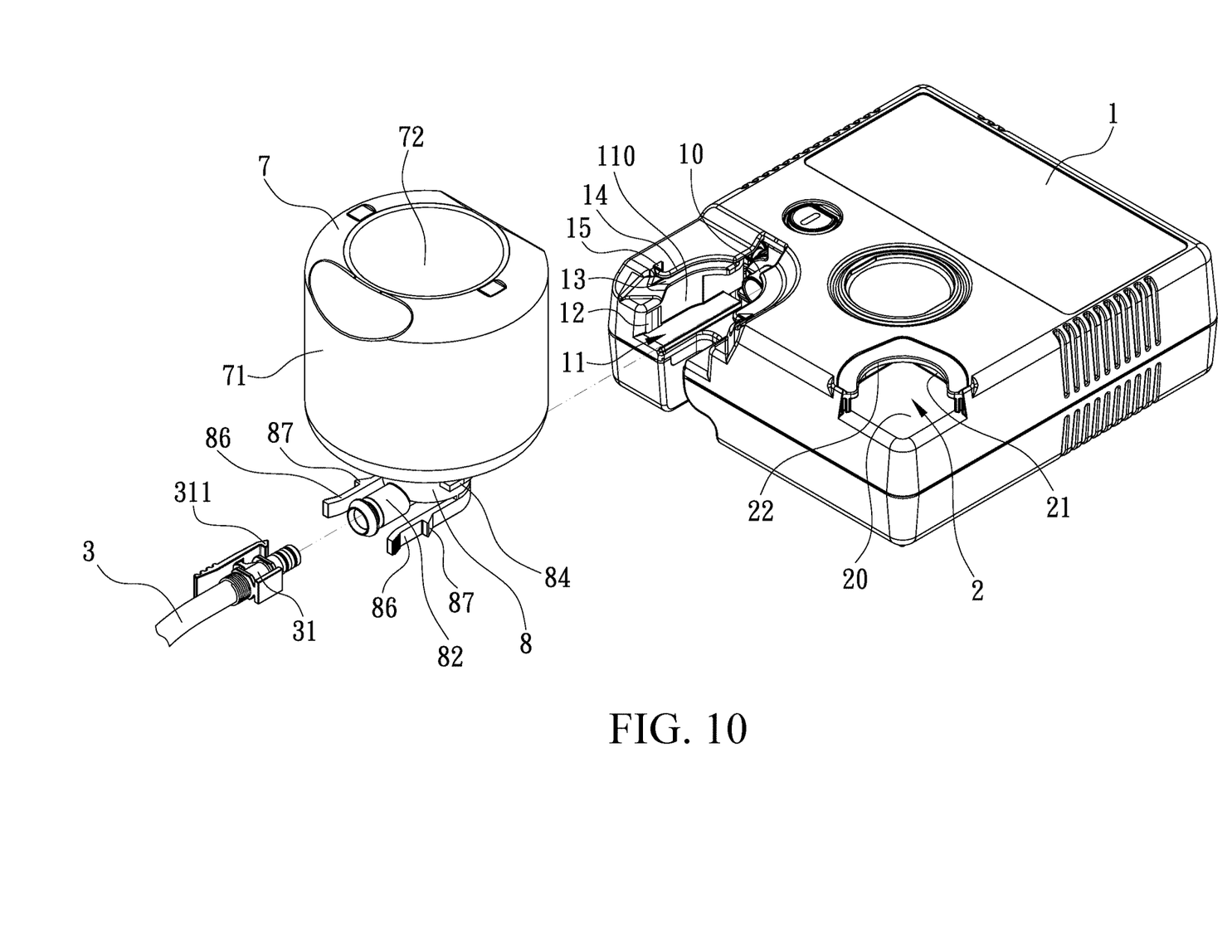
FIG. 10 is a perspective view showing the exploded components of the device of inflating and repairing the broken tire and the method of using the same according to another preferred embodiment of the present invention.
Figure 11:
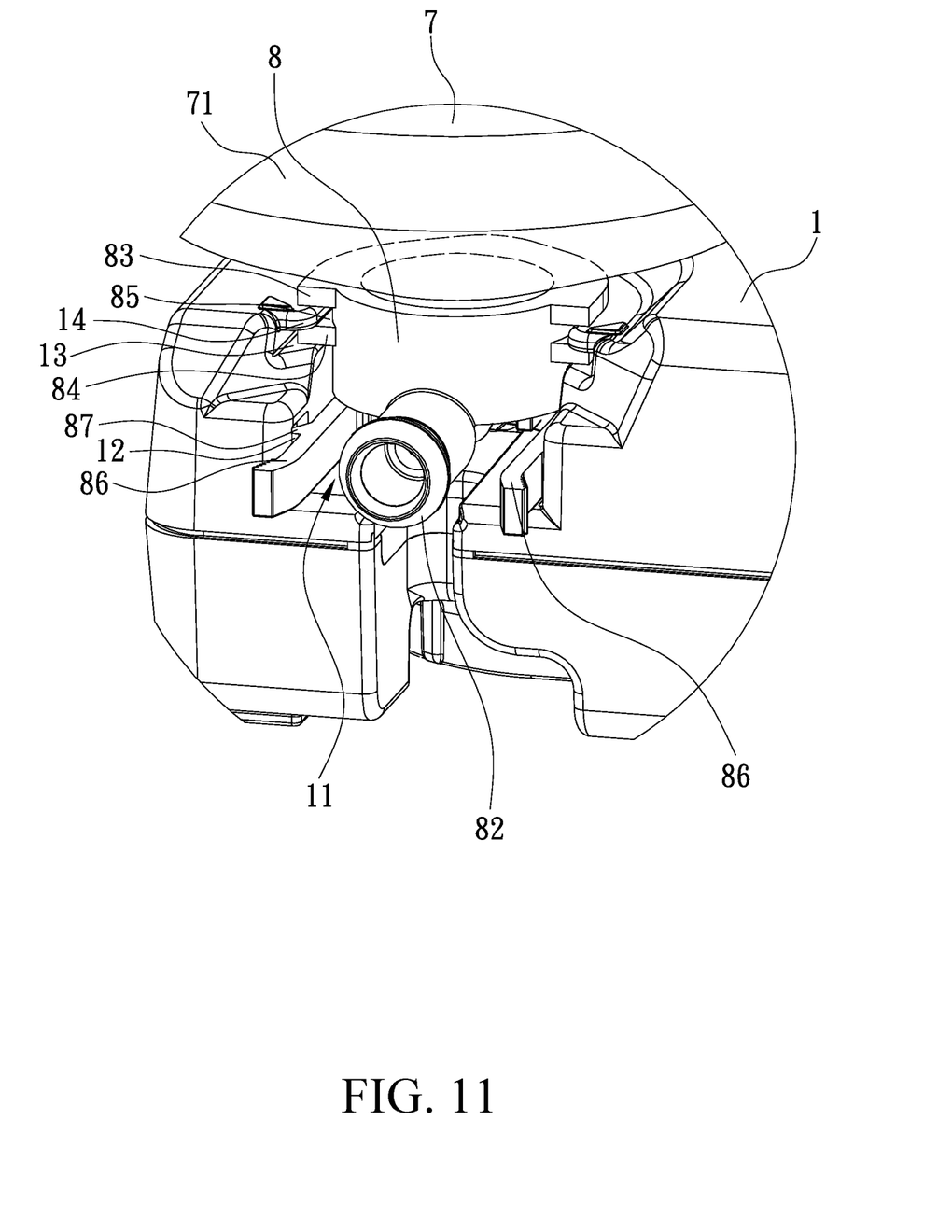
FIG. 11 is a perspective view showing the assembly of a part of the device of inflating and repairing the broken tire and the method of using the same according to another preferred embodiment of the present invention.
Figure 12:
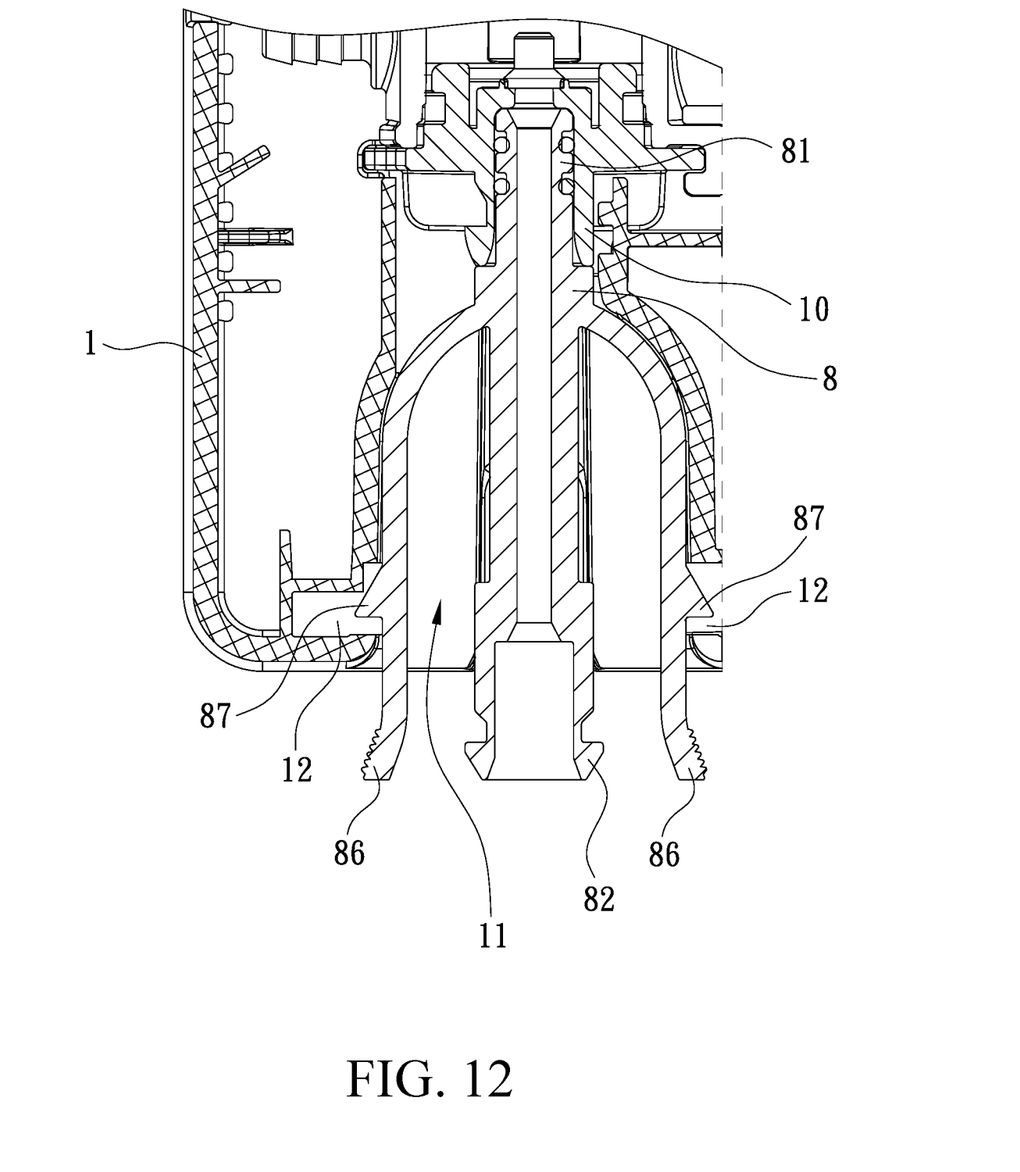
FIG. 12 is a cross sectional view showing the assembly of a part of the device of inflating and repairing the broken tire and the method of using the same according to another preferred embodiment of the present invention.
Figure 13:
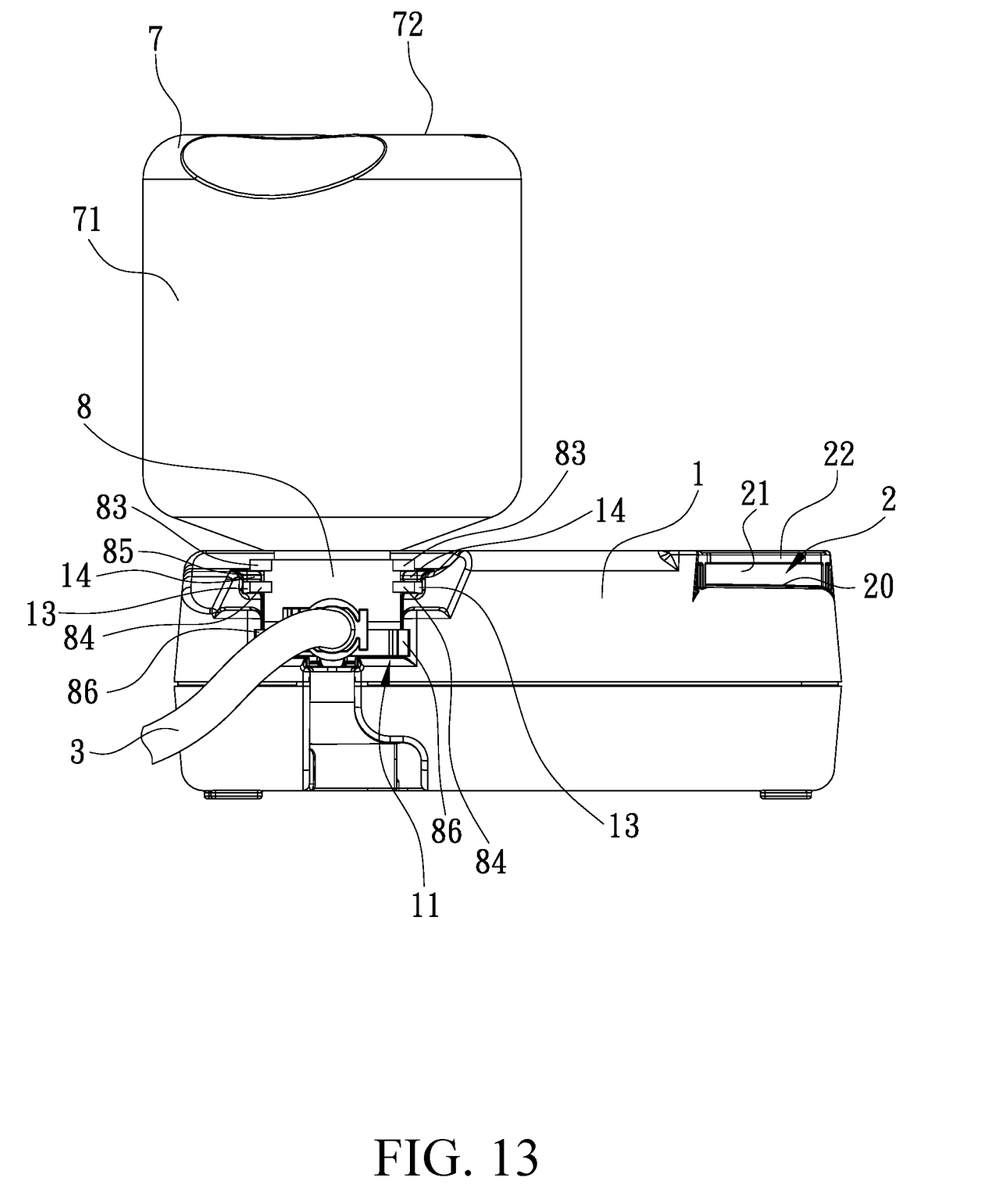
FIG. 13 is a side plan view showing the assembly of a part of the device of inflating and repairing the broken tire and the method of using the same according to another preferred embodiment of the present invention.

With reference to FIGS. 8 and 9, the method of using the device further comprises a step of:

3) connecting the first connector 31 of the first delivery hose 3 with the output hose 10 of the first coupling orifice 11 of the accommodation box 1, locking the second connector 32 of the first delivery hose 3 with the air inflow tube 51 of the cap 5 of the sealant can 4, and engaging the cap 5 with the first coupling orifice 11, wherein the groove 55 of the cap 5 is configured to accommodate the partition 14 of the first coupling orifice 11, and the second peripheral rib 54 is received in the second notch 13 of the first coupling orifice 11, thereafter an external fringe 531 of the first peripheral rib 53 abuts against the protrusion 15 of the partition 14, such that the sealant can 4 is fixed in the first coupling orifice 11 and is erected on the accommodation box 1 securely, wherein the compressed airs flow from the air compressor to force the sealant of the sealant can 4 via the output hose 10 and the first delivery hose 3 so that the sealant is outputted out of the sealant supply tube 52 of the cap 5, wherein the sealant supply tube 52 of the cap 5 is locked with the first fixing segment 61 of the second delivery hose 6, and the second fixing segment 62 of the second delivery hose 6 is locked on the air nozzle (not shown) of the broken tire, such that the compressed airs force the sealant into the broken tire, and the broken tire is inflated by the compressed airs and is repaired by the sealant, wherein the first peripheral rib 53 and the second peripheral rib 54 of the cap 5 of the sealant can 4 abut against the partition 14 of the first coupling orifice 11, and the external fringe 531 of the first peripheral rib 53 abuts against the protrusion 15 of the partition 14, such that the sealant can 4 is fixed in the first coupling orifice 11 securely to avoid a removal. Furthermore, the first delivery hose 3 is defined between the output hose 10 of the accommodation box 1 and the air inflow tube 51 of the cap 5 of the cap 4, such that the sealant does not contact and block the output hose 10 of the air compressor and does not flow into the air compressor.

With reference to FIGS. 10-13, in another embodiment, a method of using a device of inflating and repairing a broken tire comprises a step of:

4) connecting the output hose 10 of the first coupling orifice 11 of the accommodation box 1 with a sealant can 7, wherein the sealant can 7 includes a body 71 screwed with a cap 8, and the cap 8 includes an air inflow tube 81, a sealant supply tube 82, a first peripheral rib 83 horizontally extending from a top of the cap 8, a second peripheral rib 84 extending from the top of the cap 8 and spaced from the first peripheral rib 83, a groove 85 defined between the first peripheral rib 83 and the second peripheral rib 84, two flexible retainers 86 symmetrically formed on a bottom of the cap 8, and two engagement tabs 87 formed on two outer walls of the two flexible retainers 86. An open end of the body 71 of the sealant can 7 faces the cap 8 downward, and a bottom fence 72 of the body 71 of the sealant can 7 faces upward, such that the sealant can 7 is received in the first coupling orifice 11 of the accommodation box 1, an air inflow tube 81 of the cap 8 is connected with the output hose 10 of the first coupling orifice 11 of the accommodation box 1, the groove 85 is engaged with the partition 14 of the first coupling orifice 11, the second peripheral rib 84 is received in the second notch 13 of the first coupling orifice 11, and the two engagement tabs 87 of the two flexible retainers 86 of the cap 8 are engaged in the first notch 12 of the first coupling orifice 11, such that the sealant can 7 is received in the first coupling orifice 11 of the accommodation box 1, wherein the first connector 31 of the first delivery hose 3 is locked with the sealant supply tube 82 of the cap 8, when repairing and inflating the broken tire, the second connector 32 is locked with the air nozzle (not shown) of the broken tire, hence the compressed airs force the sealant into the broken tire from the body 71 via the first delivery hose 3, after the accommodation box 1 is driven by the vehicle or other power supply, thus repairing and inflating the broken tire. In addition, the first peripheral rib 83 and the second peripheral rib 84 of the cap 8 of the sealant can 7 are engaged with the partition 14 of the first coupling orifice 11, and the two flexible retainers 86 of the cap 8 are configured to flexibly engage the two engagement tabs 87 with the first notch 12 of the first coupling orifice 11 so that the sealant can 7 does not remove from the first coupling orifice 11 of the accommodation box 1. After repairing and inflating the tire, the two flexible retainers 86 of the cap 8 are pressed inward, and the sealant can 7 is pulled outward, thus removing the sealant can 7 from the output hose 10 of the first coupling orifice 11 of the accommodation box 1.

Thereby, the device of the present invention comprises the accommodation box 1 configured to receive the air compressor, and the accommodation box 1 includes the first coupling orifice 11 and the second coupling orifice 2, wherein the output hose 10 of the air compressor extends out of the first coupling orifice 11 of the accommodation box 1 and is connected with the first delivery hose 3 to inflate the compressed airs into the broken tire or the cap 5 of the sealant can 4 is received in the first coupling orifice 11 to inflate the compressed airs and supply the sealant into the broken tire. Furthermore, the cap 5 of the sealant can 4 is accommodated in the second coupling orifice 2 so that the accommodation box 1 is fixed firmly, and the first delivery hose 3 does not twine with the second delivery hose 6.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A method of using a device of inflating and repairing a broken tire comprising a step of:
    placing the device on the ground, and the device comprises:
    an accommodation box in which an air compressor is received, the air compressor being configured to compress air so as to produce compressed air, and the compressed air being outputted via an output hose, the accommodation box including a first coupling orifice adjacent to the output hose, and the accommodation box including a second coupling orifice away from the output hose;
    a sealant can including a body in which sealant is received, and a cap being connected on an open end of the body of the sealant can, the cap including an air inflow tube and a sealant supply tube, and the cap being engaged on the first coupling orifice or the second coupling orifice;
    at least one delivery hose including a first connector and a second connector connected with two components, thus inflating and repairing the broken tire diversely; and
    a step of 1) coupling the accommodation box, characterized in that the at least one delivery hose includes a first delivery hose and a second delivery hose, wherein a first end of the first delivery hose is connected with the output hose of the first coupling orifice of the accommodation box so that the compressed air flows into the first delivery hose from the air compressor, and a second end of the first delivery hose is connected with an air nozzle of a broken tire, wherein the body of the sealant can is engaged with the second coupling orifice by using the cap so that the accommodation box on which the sealant can is fixed does not move when inflating the compressed air into the broken tire.

2. The method as claimed in claim 1 further comprising a step of 2) receiving the cap of the sealant can in the second coupling orifice of the accommodation box so as to erect the sealant can on the accommodation box, characterized in that the air inflow tube of the cap is connected with the second end of the first delivery hose, the first end of the first delivery hose is connected with the output hose of the first coupling orifice, the sealant supply tube of the cap is locked with a first fixing segment of a second delivery hose, and a second fixing segment of the second delivery hose is locked on the air nozzle of the broken tire, such that the device is configured to inflate the compressed air and to supply the sealant simultaneously, the first delivery hose does not twine with the second delivery hose, and the sealant can is received in the second coupling orifice to locate away from the first coupling orifice for connecting with the output hose which is connected with the first delivery hose, thus operating the device smoothly.

3. The method as claimed in claim 1 further a step of 3) connecting the first end of the first delivery hose with the output hose of the first coupling orifice, locking the second end of the first delivery hose with the air inflow tube of the cap of the sealant can, engaging the cap with the first coupling orifice, and erecting the sealant can on the accommodation box, such that the compressed air flows from the air compressor to force the sealant of the sealant can via the output hose and the first delivery hose so that the sealant is outputted out of the sealant supply tube of the cap, wherein the sealant supply tube of the cap is locked with the first fixing segment of the second delivery hose, and the second fixing segment of the second delivery hose is locked on the air nozzle of the broken tire, such that the compressed air force the sealant into the broken tire, and the broken tire is inflated by the compressed air and is repaired by the sealant, wherein the first delivery hose is defined between the output hose of the accommodation box and the air inflow tube of the cap of the cap, such that the sealant does not contact and block the output hose of the air compressor and does not flow into the air compressor.

4. The method as claimed in claim 1 further comprising a step of 4) connecting the sealant can with the first coupling orifice by using the cap, characterized in that an air inflow tube of the cap is connected with the output hose of the first coupling orifice of the accommodation box, and the cap includes a sealant supply tube locked with the nozzle of the broken tire via the first delivery hose, thus supplying the sealant into the broken tire.

5. The method as claimed in claim 1, characterized in that the second coupling orifice of the body further includes a plane formed on a bottom thereof, an internal fence extending upward from a peripheral side of the plane, and a C-shaped rib extending inward from a top of the internal fence, wherein a receiving space is defined between the C-shaped rib and the plane to accommodate the cap of the sealant can.

6. The method as claimed in claim 1, characterized in that the first coupling orifice of the accommodation box is formed in an inverted U shape, the first coupling orifice has a first notch formed on a bottom of an peripheral wall thereof, a second notch formed on a top of the peripheral wall of the first coupling orifice opposite to the first notch, a partition formed adjacent to a top of the second notch, and a protrusion formed on the partition;

and the sealant can further includes a body, the cap is screwed on the body of the sealant can, and the cap includes an air inflow tube, a sealant supply tube, a first peripheral rib horizontally extending from an outer wall of the cap, a second peripheral rib extending from the outer wall of the cap and spaced from the first peripheral rib, and a groove defined between the first peripheral rib and the second peripheral rib, wherein the first connector of the first delivery hose is connected with the output hose of the first coupling orifice of the accommodation box, and the second connector is locked with the air inflow tube of the cap of the sealant can, wherein the cap is engaged in the first coupling orifice, the groove is configured to accommodate the partition of the first coupling orifice, the second peripheral rib is received in the second notch of the first coupling orifice, thereafter an external fringe of the first peripheral rib of the cap abuts against the protrusion of the partition, such that the sealant can is fixed in the first coupling orifice and is erected on the accommodation box securely.

7. The method as claimed in claim 1, characterized in that the output hose of the first coupling orifice of the accommodation box is connected with another sealant can, wherein the sealant can includes a body screwed with a cap, and the cap includes an air inflow tube, a sealant supply tube, a first peripheral rib horizontally extending from a top of the cap, a second peripheral rib extending from the top of the cap and spaced from the first peripheral rib, a groove defined between the first peripheral rib and the second peripheral rib, two flexible retainers symmetrically formed on a bottom of the cap, and two engagement tabs formed on two outer walls of the two flexible retainers; wherein an open end of the body of the sealant can faces the cap downward, and a bottom fence of the body of the sealant can faces upward, such that the sealant can is received in the first coupling orifice of the accommodation box, the air inflow tube of the cap is connected with the output hose of the first coupling orifice of the accommodation box, the groove is engaged with the partition of the first coupling orifice, the second peripheral rib is received in the second notch of the first coupling orifice, and the two engagement tabs of the two flexible retainers of the cap are engaged in the first notch of the first coupling orifice, such that the sealant can is received in the first coupling orifice of the accommodation box.

* * * * *